United States Patent [19]
Kessel

[11] Patent Number: 5,339,638
[45] Date of Patent: Aug. 23, 1994

[54] THERMOELECTRIC COOLER CONTAINER WITH CIGARETTE LIGHTER SUPPORT JACK

[76] Inventor: Suzette C. Kessel, Hwy. 69 South, P.O. Box 634, Alto, Tex. 75925

[21] Appl. No.: 93,067

[22] Filed: Jul. 16, 1993

[51] Int. Cl.⁵ .............................................. F25B 21/02
[52] U.S. Cl. ...................................... 62/3.61; 62/3.6; 62/3.62; 62/457.1; 62/457.9
[58] Field of Search ................... 63/3.2, 3.3, 3.6, 3.61, 63/3.62, 3.7, 457.1, 457.2, 457.7, 457.9, 371

[56] References Cited

U.S. PATENT DOCUMENTS 4,107,934  8/1978  Beitner .................................. 62/3.61
4,346,562  8/1982  Beitner .................................. 62/3.61

*Primary Examiner*—John M. Sollecito
*Attorney, Agent, or Firm*—Ross, Howison, Clapp & Korn

[57] ABSTRACT

A thermoelectrically controlled cavity (22) is provided in a body (13) that is adaptable to be inserted into a cigarette lighter socket (14) with a jack (12). The cavity (22) has disposed therein thermoelectric cooling elements (26) that are operable to pump heat from a heat spreader plate to a heat sink (18) to maintain the temperature in the cavity (22) at a lower temperature than the automobile cab in which the socket (18) is disposed.

10 Claims, 3 Drawing Sheets

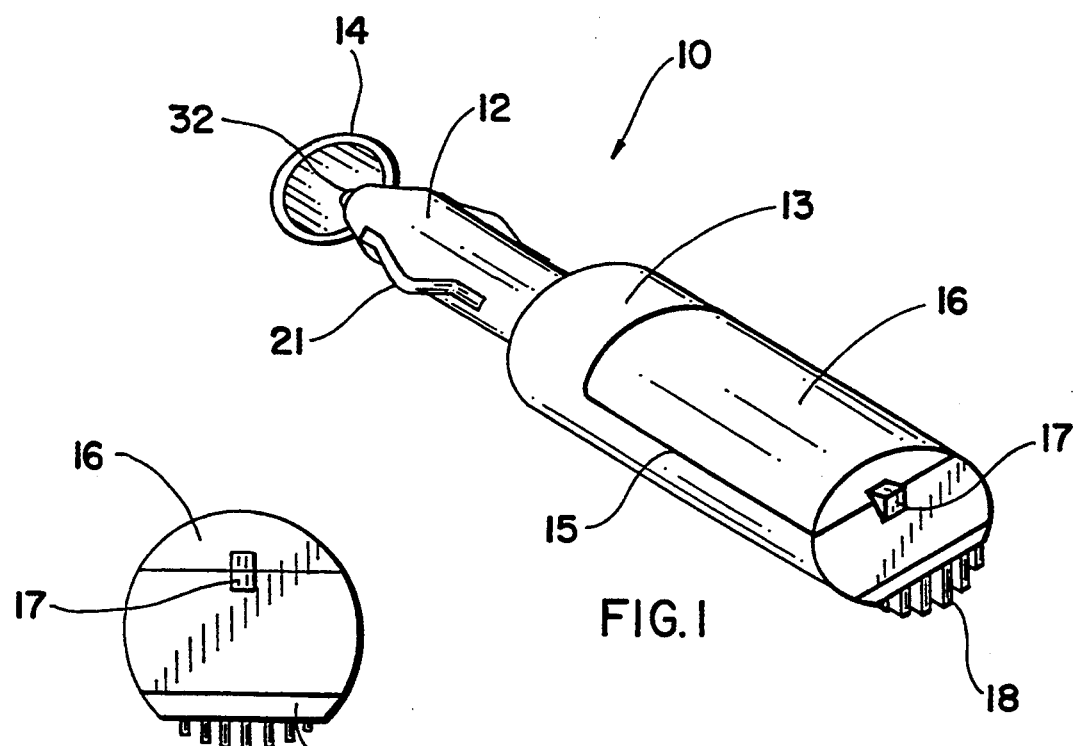
FIG. 1
FIG. 2
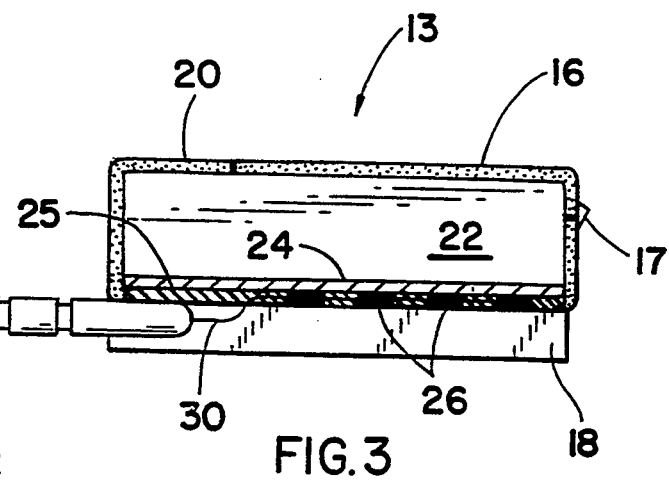
FIG. 3
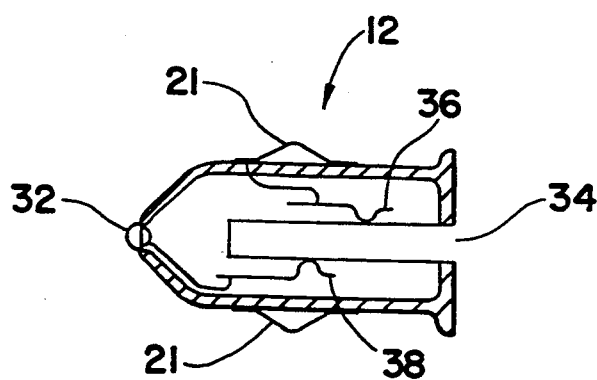
FIG. 3a

THERMOELECTRIC COOLER CONTAINER WITH CIGARETTE LIGHTER SUPPORT JACK

TECHNICAL FIELD OF THE INVENTION

The present invention pertains in general to containers for cooling and heating and, more particularly, to a container having the temperature thereof controlled by a thermoelectric cooler element (TEC) for use with an automobile.

BACKGROUND OF THE INVENTION

When travelling in an automobile, it is sometimes necessary to leave heat sensitive items such as lipstick, cosmetics or medicines, etc. on the dashboard, seat or floor of an automobile when running errands. However, in relatively hot climates, or in the presence of bright sun and an enclosed space within the automobile, such things as lipstick, lip balm, etc., can deteriorate due to heat. This is especially so in the southern climates where, in the summer, the temperature within the cab of an automobile can reach in excess of 130°. Usually, this is for only a short period of time, but even this short period of time can ruin lipstick left on the dashboard. As such, some type of container or protective device is needed to allow the user of the automobile to protect such items.

SUMMARY OF THE INVENTION

The present invention disclosed and claimed herein comprises a battery operated air conditioned compartment for use in an automobile. The compartment includes a container having insulated walls and an insulated cover to define a cavity therein for storing temperature sensitive articles. A support is connected to the container, the support interfaced with a cigarette lighter jack extending therefrom. The cigarette lighter jack is operable to insert into a cigarette lighter socket or other similar power outlet in an automobile dashboard. A heat sink disposed adjacent to the container is operable to contain either a single or a plurality of thermoelectric cooling elements. The thermoelectric cooling elements are operable to interface with the cavity to transfer heat between the cavity and the heat sink. A control device is operable to control the thermoelectric cooling elements to transfer heat between the cavity and the heat sink.

In another aspect of the present invention, the support member is comprised of a cradle. The cradle is adapted to be pivotally interfaced with the cigarette lighter jack such that the container can be held against the cradle and rotated relative to the orientation of the cigarette lighter jack.

In a further aspect of the present invention, the thermoelectric cooling elements are partitioned such that all of the thermoelectric cooling elements can be operated in one mode of operation and, in a second mode of operation, only a portion thereof can be activated. The voltage provided to the cigarette lighter jack is sensed, and when the voltage is above a predetermined level, this indicating an external voltage generating source, all of the thermoelectric cooling elements are activated. When the voltage falls below the predetermined level, this indicates that the voltage generating source is not present and that only battery voltage is being supplied. In this mode, only a portion of thermoelectric cooling elements are activated.

BRIEF DESCRIPTION OF THE DRAWINGS

For a more complete understanding of the present invention and the advantages thereof, reference is now made to the following description taken in conjunction with the accompanying Drawings in which:

FIG. 1 illustrates a perspective view of the TEC container of the present invention;

FIG. 2 illustrates an end view of the container of FIG. 1;

FIG. 3 illustrates a cross-sectional side view of the container of FIG. 1;

FIG. 3a illustrates a cross-sectional view of the socket that fits within the cigarette lighter attachment of the automobile;

DETAILED DESCRIPTION OF THE INVENTION

Figure 4:
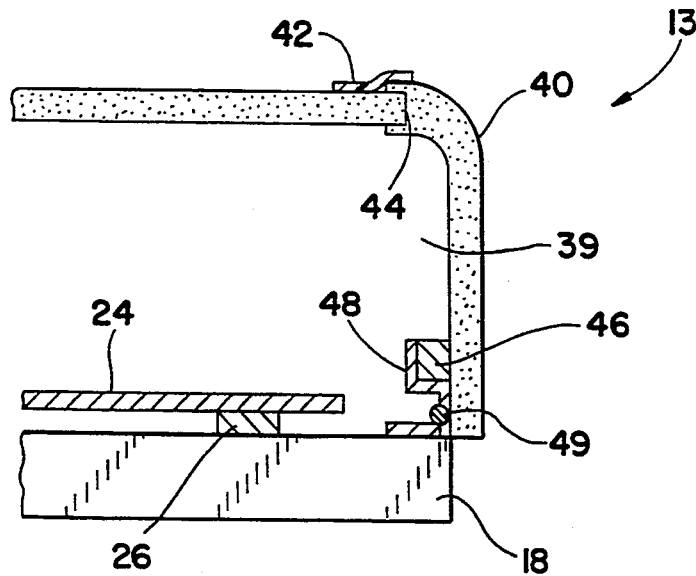
FIG. 4 illustrates an end view of one embodiment for opening the container.

Referring now to FIG. 1, there is illustrated a perspective view of the thermoelectric cooling element (TEC) container of the present invention. The container is generally represented by a reference numeral 10. It is comprised of a main body having a cavity (not shown) contained therein, with a cover 16 removably attached to an opening 15 in the body 13. A latch 17 is operable to secure the cover 16 to the body 13 about the opening 15.

The container 10 has associated adjacent the body 13 a jack 12, which is a conventional electrical jack utilized for cigarette lighter-type attachments, these attachments typically interfaced with a conventional cigarette lighter socket found in substantially all U.S. automobiles. The cigarette lighter socket is represented by a socket 14. The jack 12 is operable to be inserted into the socket 14 and electrical contacts 21 and 31 are operable to make contact on the interior of the socket 14 and supply power thereto.

As will be described hereinbelow, the container 10 is an insulated container which allows a perishable product, or a product that could melt, to be disposed within the cavity in the body 13. Thermoelectric cooler (TEC) elements internal to the body 13 are operable to cool (or heat) whatever is contained within the cavity in the body 13. A heat sink 18 is provided on the lower surface of the body 13 to allow sufficient heat transfer for the TEC elements. A frontal view of the body 13 and the cover 16 is illustrated in FIG. 2.

Referring now to FIG. 3, there is illustrated a cross-sectional side view of the container 10 of FIG. 1, with FIG. 3a illustrating a detail of the jack 12. It is noted that the illustration of FIG. 3 depicts the body 13 without the jack 12 and FIG. 3a illustrates the jack 12.

The body 13 has a cavity 22 associated therewith, the cavity 22 defined on the outer boundaries thereof by the walls 20 and the cover 16. Both the walls 20 and the cover 16 are fabricated from an insulated material. This insulated material is a closed cell foam having a thickness of approximately 0.35 inches. The foam is a typical polyurethane foam of the type typically utilized to fabricate covers for insulated cups. Although illustrated as a single layer, a rigid innersupport system could be provided to accommodate a more flexible outer cover. In general, the more flexible outer nature of the walls 20 and the cover 16 prevent damage to the outer surface. Further, the thickness can be increased, depending upon the insulating properties desired.

The insulating effect provided by the walls 20 are utilized for a certain period of time. As will be described hereinbelow, the container 10 is designed to provide a minimal amount of cooling. For example, when an automobile is driven with the air conditioning on, the temperature within the interior 22 of the container 10 will be disposed at an acceptable level. Merely by closing the container 10, very highly insulative material will prevent heat transfer from the exterior of the container 20 to the interior of the container when the automobile is parked for a short time in a very hot and exposed area. Although the temperature can rise very quickly in the cab of the automobile, heat transfer from the exterior of the container into the interior of the container will be impeded by the walls. This will be further described hereinbelow. The TEC elements contained within the container 10 and the body 13 further provide for pumping the heat from the interior 22 to the exterior of the container 10.

The walls 20 are disposed over the heat sink 18, the heat sink 18 having a relatively flat surface disposed thereon. Thermoelectric cooler (TEC) elements 26 are disposed on the surface of the heat sink 18 and thermally attached thereto to provide a very low thermal resistance therebetween. A heat spreader plate 24 is attached to the other side of the TEC elements 26 to allow the heat to be spread over a large area as compared to the surface area of the one side of the TEC elements 26. An insulative layer 25 of closed cell foam material is disposed between the heat spreader plate 24 and the upper surface of the heat sink 18. Therefore, the TEC elements 26, in the conventional operation thereof, are operable to "pump" heat from heat spreader plate 24 to the heat sink 18 to thereby remove heat from the cavity 22. However, as is also well known with respect to TEC elements 26, the operation can be reversed and heat can be pumped from the heat sink 18 to the heat spreader plate 24.

The TEC elements 26 are connected through a wire 30 to a jack 28, the jack 28 providing for two polarities to be input, a positive and a negative polarity. The jack 28 is a typical audio jack utilized on conventional microphones. This jack 28 is secured to the heat sink 18 to provide a relatively rigid interface therewith. The jack 28 is operable to be inserted into the cigarette lighter jack 12, as illustrated in FIG. 3a, and has two spring members 36 and 38 on the interior thereof that are typically copper clad spring members. One of the spring members 36 is attached to the electrical contact 21 on the exterior of the jack 12. Another contact 32 disposed on the tip of the jack 12 is connected to the spring member 38. The spring members 36 and 38 each have a small protrusion that protrudes into an interior channel 34 in the jack 12, which is operable to receive the jack 28. When the jack 28 is inserted in the receptacle 34, one portion of the jack 28 contacts the protrusion in the spring member 38, and one portion on the jack 28 contacts the protrusion in the spring member 36, the protrusions in spring members 36 and 38 being offset. This is a conventional structure. The receptacle 34 is formed such that it also has fairly high structural integrity such that when the jack 28 is inserted within the receptacle 34, a very sturdy fit is achieved. This will allow the jack 12 to be inserted within the cigarette lighter socket 14 and support the entire container 10.

Referring now to FIG. 4, there is illustrated an alternate embodiment of the cover. The body 13 has a single opening 39 disposed on the end thereof. A hinged end cover 40 is provided that is operable to be disposed on an offset hinge 48. The cover 40 has disposed on the lower edge thereof a mounting block 46, which mounting block 46 protrudes from the interior surface of the cover 40 at the lower edge thereof. Protrusion 46 is connected to the offset hinge 48, the offset hinge 48 then pivotable about a pin 49. The upper edge of the cover 40 has a slot 44 disposed therein, which slot 44 is operable to interconnect with one edge of the outer wall of the body 13. A latch 42 is provided for securing the slot 40 adjacent to and secured against the outer peripheral edge of the container 13.

Figure 5:
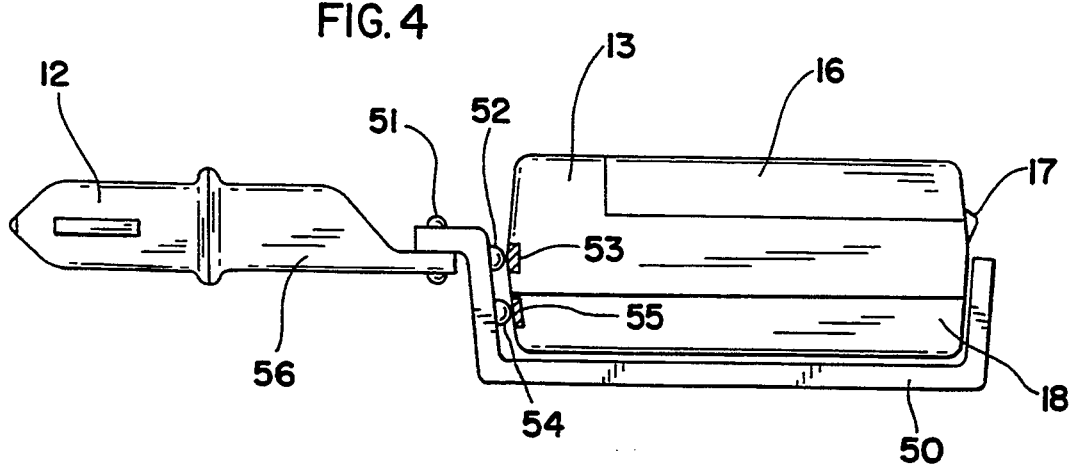
FIG. 5 illustrates an alternate embodiment of the container of FIG. 1.

Referring now to FIG. 5, there is illustrated an alternate embodiment of the present invention wherein the container 13 is formed separate of the jack 12. The container 13 is operable to be disposed within a cradle 50. The cradle 50 extends underneath the container 13 and partially up each end thereof. This allows the container 13 to be aligned in a given direction and upright within the cradle 50. Alignment marks (not shown) provide for this alignment. The cradle 50 is operable to be mounted in a swivelling manner on a support arm 56, which support arm 56 is inserted in the jack 12, as described above with respect to FIG. 3 and FIG. 3a. A pin 51 is operable to be disposed between the cradle 50 and the support arm 56 to allow the cradle 50 to swivel with respect thereto. Therefore, when the jack 12 is inserted in the socket 14, the entire container 13 disposed in the cradle 50 can be pivoted such that it is not protruding directly out from the dash of the automobile.

Container 13 has two contacts 53 and 55 disposed on the end surface thereof and within the cradle 50. Two mating protrusions 52 and 54 are provided for respectively interfacing with the respective contacts 53 and 55. This is a conventional electrical connection for a cradle operated charging unit.

Figure 6:
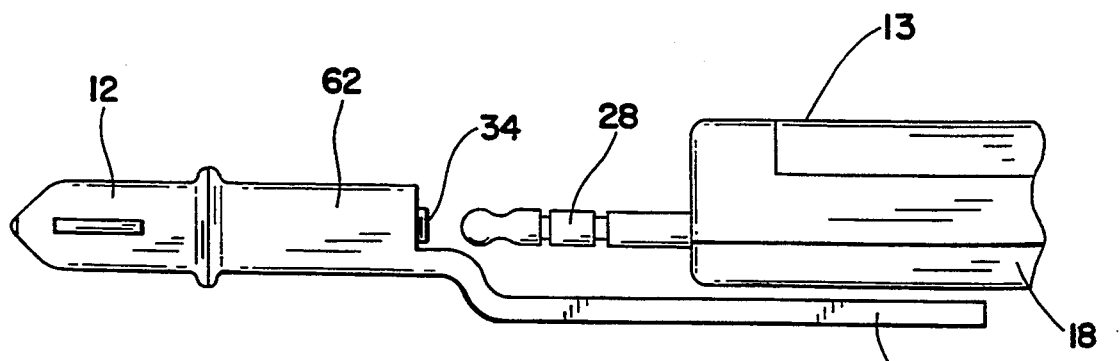
FIG. 6 illustrates an alternate embodiment of the container of FIG. 1 illustrating the interconnection between the male jack of the container and the female jack in the cigarette lighter.

Referring now to FIG. 6, there is illustrated an alternate embodiment of the present invention. The jack 12 has a protrusion 62 extending therefrom, which protrusion 62 is operable to contain the receptacle 34 and the contacts 36 and 38. A support arm 64 extends outward from the bottom portion of the protrusion 62. The body 13 and the jack 28 are inserted within the receptacle 34 in the protrusion 62, the leverage arm 64 is operable to support the lower surface thereof. This takes some of the force off of the jack 38/receptacle 34 combination.

Figure 7:
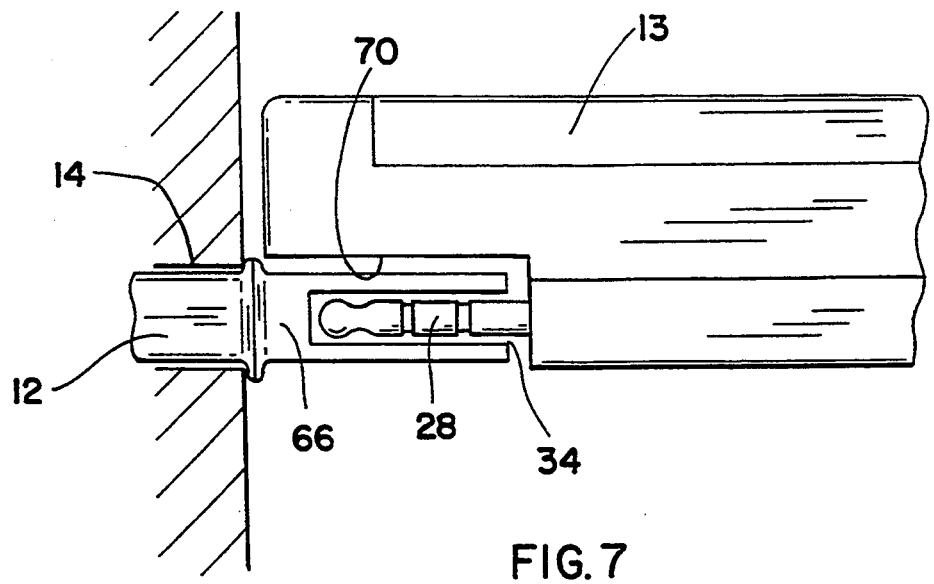
FIG. 7 illustrates an alternate embodiment of the connector configuration.

Referring now to FIG. 7, there is illustrated an alternate method for mounting the receptacle 34 and the jack 28. An extension 66 is provided adjacent to and integral with the cigarette lighter jack 12. The extension 66 contains the receptacle 34 and the pins 36 and 38 (not shown). The body 13 has an indented area 70 disposed on the end thereof which is a recessed portion that allows the body 13 to abut the wall of the dashboard on which the socket 14 is disposed. The indentation 70 substantially matches the extension 66. The indentation 70 has the jack 28 recessed therefrom as compared to the embodiment of FIG. 6.

Figure 8:
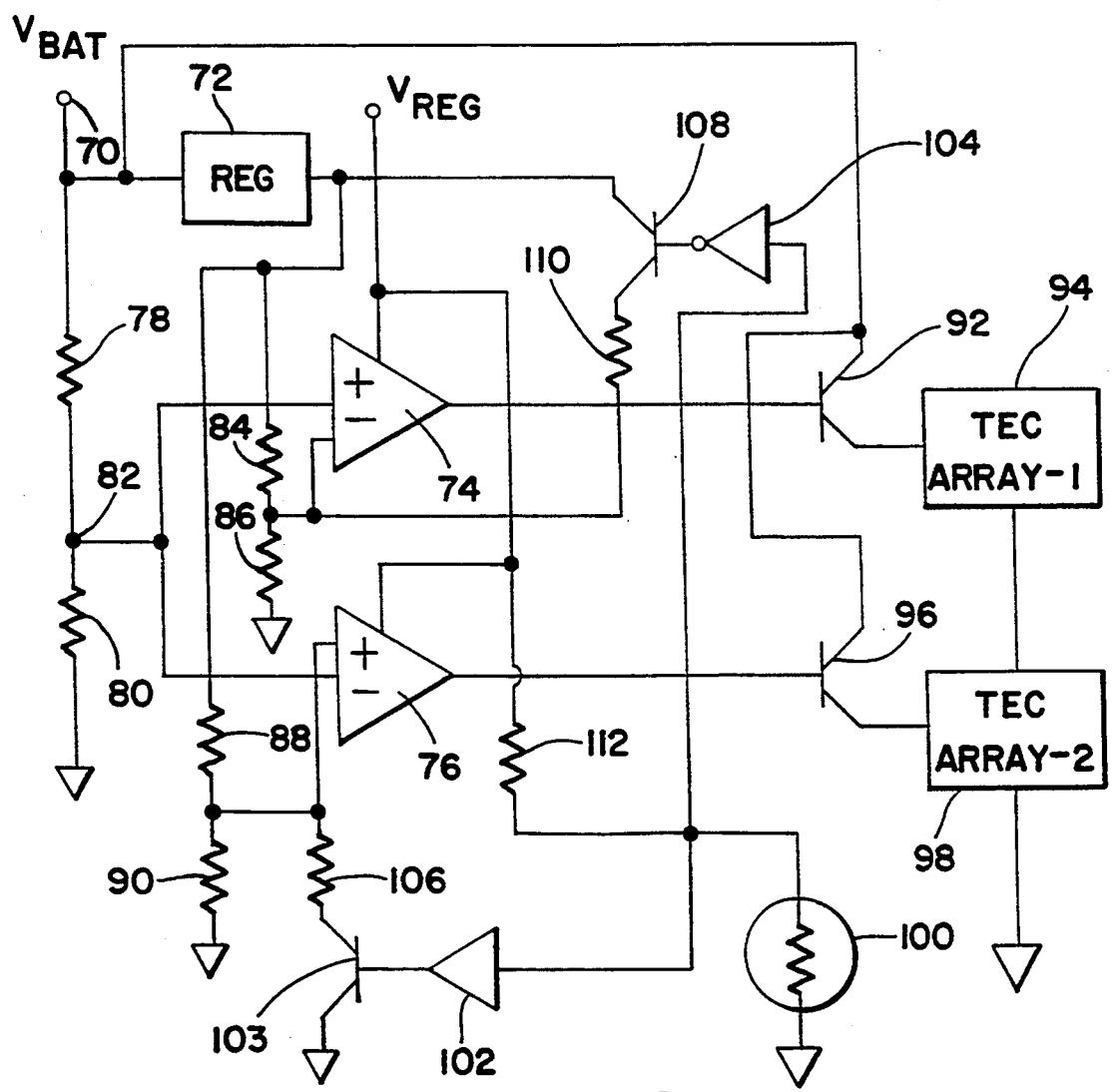
FIG. 8 illustrates a schematic diagram of a control system for allowing sensing of two separate temperatures.

Referring now to FIG. 8, there is illustrated one embodiment for controlling the TEC elements 26. In general, the TEC elements 26 draw a finite amount of current. Although this current is minimal, the amount of heat that could be pumped from the interior of the container 13 to the exterior is a function of the number of TEC elements 16, and the current therethrough. If the current were reduced, the amount of heat transferred from the interior will be reached. However, if a high degree of cooling is desirable, this will require a larger amount of current and a larger number of TEC elements. In particular, TEC elements typically have an efficiency versus voltage rating such that the TEC elements 26 operate at maximum efficiency at a certain voltage. It is therefore desirable to match the TEC elements 26 to the operating voltage. However, when an automobile is running and the alternator is generating the power, as opposed to the battery, current is of little concern. This, of course, is not the case when the engine is turned off and the TEC elements 26 will run on the battery. In the latter case, a relatively high current draw may, over time, drain the battery. The circuit of FIG. 8 prevents this by sensing whether the automobile is running or not and selecting a different configuration for the TEC elements 26.

Referring further to FIG. 8, the battery is supplied to a terminal 70 at a voltage $V_{BAT}$. The voltage $V_{BAT}$ is input to a regulator circuit 72, which is operable to convert the battery voltage to a regulated voltage, the regulated voltage maintaining a constant output over normal ranges of the voltage $V_{BAT}$. This regulated voltage is labelled $V_{REG}$. The regulated voltage is operable to power two comparators 74 and 76. The two comparators 74 and 76 are configured as a "window comparator", wherein the output of comparator 74 goes active (a logic high) whenever the voltage of $V_{BAT}$ is above a predetermined level and the voltage of regulator 76 goes active whenever the voltage $V_{BAT}$ is below a predetermined level. The voltage $V_{BAT}$ is divided down by a resistive divider comprised of resistors 78 and 80 connected in series and having a common point 82. The common point 82 is the tap of the divider and is connected to the positive input of the comparator 74 and the negative input of the comparator 76. The negative input of the comparator 74 is connected to the tap of a resistive divider comprised of series connected resistors 84 and 86, which divider is operable to divide down the voltage $V_{REG}$ to a reference voltage. Similarly, a resistive divider comprised of series connected resistors 88 and 90 has the tap thereof connected to a positive input of the comparator 76. The output of comparator 74 drives the base of an NPN transistor 92, the collector thereof connected to the voltage $V_{BAT}$ and the emitter thereof connected to the input of a TEC array 94. Similarly, the output of the comparator 76 drives the base of an NPN transistor 96, the collector thereof connected to $V_{BAT}$ and the emitter thereof connected to drive a TEC array 98. TEC array 94 and 98 are connected in series such that voltage applied to TEC array 94 drives both the TEC array 94 and the TEC array 98, whereas the transistor 96 only drives the TEC array 98. Therefore, whenever the transistor 92 conducts, both arrays 94 and 98 are driven and, whenever the transistor 96 conducts, only the array 98 is driven.

In general operation, the voltage of a battery in a car operates at around 12.0–12.5 volts. However, when the alternator is fully operating, the voltage is between 13.5–14.5 volts. The comparator 74 has the reference voltage on the negative input thereof set by the resistors 84 and 86 such that the output will be high whenever the voltage is above approximately 13.5 volts. This is a trip point. Similarly, whenever the voltage falls below 13.5 volts, the comparator 74 goes inactive and the comparator 76 goes active.

In order to accommodate for temperature control, a thermistor 100 is provided which is operable to drive a non-inverting buffer 102 and inverting buffer 104. The non-inverting buffer 102 drives the base of an NPN transistor 103 having the emitter thereof connected to ground and the collector thereof connected through a resistor 106 to the positive input of the comparator 76. Similarly, the output of the inverting buffer 104 drives the base of a PNP transistor 108, the emitter thereof connected to the voltage $V_{REG}$ and the collector thereof connected through a resistor 110 to the negative input of the comparator 74. In this way, whenever the thermistor 100 is in an environment that decreases in temperature, the resistance thereof decreases and pulls the voltage on the input to non-inverting buffer 102 and inverting buffer 104 low through a resistor 112, such that transistors 103 and 108 conduct, thus inactivating the respective comparators 76 and 74. This will effectively turn off the TEC arrays 94 and 98.

In summary, there has been provided a container for use with an automobile cigarette lighter socket. The container includes a body having a cavity formed therein and connected to a cigarette lighter jack. The body has disposed on the lower surface thereof a heat sink having adhered thereto thermoelectric cooling (TEC) elements. The TEC elements are spaced between the heat sink and the heat spreader plate interior to the cavity. The cavity is insulated such that the TEC elements can be powered to maintain a lower temperature within the cavity. A door on the cavity allows items such as lipstick, etc. to be placed in the cavity and maintained at a lower temperature than that of the car.

Although the preferred embodiment has been described in detail, it should be understood that various changes, substitutions and alterations can be made therein without departing from the spirit and scope of the invention as defined by the appended claims.

What is claimed is:

1. An air conditioned compartment for use in an automobile, comprising:
    a container having insulated walls and an insulated cover to define an enclosed cavity therein accessible through said cover for storing temperature sensitive articles;
    a support connected to said container;
    a cigarette lighter jack extending from said support, said support and said jack defining means to support said container from a cigarette lighter socket in an automobile dashboard;
    a heat sink disposed adjacent said container;
    a plurality of thermoelectric cooling elements disposed on said heat sink and interfacing with said cavity to transfer heat between said cavity and said heat sink; and
    a control mechanism for operating said thermoelectric cooling element to transfer heat between said cavity and said heat sink.

2. The air conditioned compartment of claim 1, wherein said container has a resilient covering over the surface thereof.

3. The air conditioned compartment of claim 1, wherein said temperature sensitive articles are sensitive to heat.

4. The air conditioned compartment of claim 1, wherein said support comprises a cradle attached to said cigarette lighter jack for extending from said cigarette lighter jack when said cigarette lighter jack is disposed in the cigarette lighter socket, said container removably interfaced with said cradle.

5. The air conditioned compartment of claim 4, wherein said cradle comprises an extensible cradle extending from a pivot point, and a pivoting support member for pivotally interfacing with said cradle at said pivot point to allow said cradle to pivot relative to said pivot point and said cigarette lighter jack such that said container when disposed in said cradle can pivot relative to the orientation of said cigarette lighter jack.

6. The air conditioned compartment of claim 4, wherein said cradle is rigidly attached to said cigarette lighter jack.

7. The air conditioned compartment of claim 1, wherein said thermoelectric cooling elements are operable to transfer heat away from said compartment in said container such that the temperature within the said compartment can be maintained lower than the temperature on the exterior of said container.

8. The air conditioned compartment of claim 1, wherein said control is operable to sense temperature interior to said container and terminate operation of said thermoelectric cooling elements when the temperature in said container meets predetermined temperature criteria.

9. The air conditioned compartment of claim 8, wherein said predetermined temperature criteria are a temperature lower than a predetermined level such that when the temperature in said container falls below said predetermined level, operation of said thermoelectric cooling elements is terminated.

10. The air conditioned compartment of claim 1, wherein said control device comprises:

means for sensing the voltage of the battery of the automobile;

means for segmenting said thermoelectric cooling elements such that, in a first mode of operation, all of said thermoelectric cooling elements are operated, and in a second mode of operation, only a portion of said thermoelectric cooling elements are operated; and a voltage control apparatus for activating said thermoelectric cooling elements in said first mode when said voltage is sensed by said sensing means to be above a predetermined level, indicating that the automobile is running and receiving power from a voltage generating source associated with the automobile and operating

* * * * *

UNITED STATES PATENT AND TRADEMARK OFFICE
CERTIFICATE OF CORRECTION

PATENT NO. : 5,339,638
DATED : August 23, 1994
INVENTOR(S) : Suzette C. Kessel

It is certified that error appears in the above-indentified patent and that said Letters Patent is hereby corrected as shown below:

In the Claims:

Claim 10, Column 8, line 27, insert --in said second mode of operation when the voltage sensed by said sensing means falls below said predetermined voltage and indicating that power is being received from the battery associated with the automobile and not with the voltage generating source.-- following "operating".

Signed and Sealed this

Twenty-ninth Day of November, 1994

Attest:

BRUCE LEHMAN

*Attesting Officer*  *Commissioner of Patents and Trademarks*